(12) United States Patent
Park

(10) Patent No.: US 7,486,728 B2
(45) Date of Patent: Feb. 3, 2009

(54) METHOD AND APPARATUS TO CONTROL OPERATION OF AN EQUALIZER

(75) Inventor: Sung-woo Park, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 562 days.

(21) Appl. No.: 11/157,933

(22) Filed: Jun. 22, 2005

(65) Prior Publication Data

US 2006/0002462 A1 Jan. 5, 2006

(30) Foreign Application Priority Data

Jun. 30, 2004 (KR) ............... 10-2004-0050257

(51) Int. Cl.
*H03H 7/30* (2006.01)
*H03H 7/40* (2006.01)
*H03K 5/159* (2006.01)

(52) U.S. Cl. .................................... 375/233
(58) Field of Classification Search ......... 375/229–236, 375/350; 708/300, 323
See application file for complete search history.

(56) References Cited

U.S. PATENT DOCUMENTS

| | | | | |
|---|---|---|---|---|
| 5,027,369 A * | 6/1991 | Kuenast | ............... | 375/233 |
| 5,644,595 A | 7/1997 | Yamasaki et al. | | |
| 5,684,827 A * | 11/1997 | Nielsen | ............... | 375/232 |
| 5,694,423 A * | 12/1997 | Larsson et al. | ............... | 375/231 |
| 6,215,818 B1 | 4/2001 | Velez et al. | | |
| 6,304,598 B1 * | 10/2001 | Agazzi et al. | ............... | 375/232 |
| 6,426,972 B1 | 7/2002 | Endres et al. | | |
| 6,587,504 B1 | 7/2003 | Murakami et al. | | |
| 6,633,606 B1 | 10/2003 | Oh | | |
| 2002/0024996 A1 | 2/2002 | Agazzi et al. | | |
| 2004/0032529 A1 * | 2/2004 | Jeon et al. | ............... | 348/571 |

(Continued)

FOREIGN PATENT DOCUMENTS

EP 1 033 851 9/2000

(Continued)

OTHER PUBLICATIONS

Korean Office Action dated Mar. 31, 2006 issued in KR 2004-50257.

(Continued)

*Primary Examiner*—Jean B Corrielus
(74) *Attorney, Agent, or Firm*—Stanzione & Kim LLP

(57) ABSTRACT

A method and an apparatus to control an equalizer. A signal to noise ratio of an output of the equalizer is measured, the measured signal to noise ratio is fed back to the equalizer controlling apparatus, and convergence information of the equalizer is monitored and at the same time effective tap information of the equalizer is monitored. Accordingly, one or more taps can be selected to perform equalization in the equalizer and to control operation of the equalizer. Thus, it is not necessary to estimate channel information in order to properly operate the equalizer. Thus, since the channel information need not be estimated, a configuration of the equalizer is relatively simple. Additionally, it is possible to select a proper tap depending on a change in a channel environment and to update a corresponding tap coefficient. Accordingly, performance can be improved.

39 Claims, 2 Drawing Sheets

U.S. PATENT DOCUMENTS

2004/0090981 A1* 5/2004 Lin et al. .................. 370/445
2004/0091070 A1* 5/2004 Kim et al. .................. 375/350
2007/0036345 A1* 2/2007 Usman et al. .......... 379/406.08

FOREIGN PATENT DOCUMENTS

| JP | 2002-325055 | 11/2002 |
|---|---|---|
| KR | 10-0245997 | 2/1999 |
| KR | 2003-00307 | 6/2003 |

OTHER PUBLICATIONS

Sirikiat Ariyavisitakul et al.; "Tap-Selectable Decision Feedback Equalization"; IEEE 1997; pp. 1521-1526.

Dutch Search Report dated Jul. 7, 2006 issued in NL 1029383.

Parthapratim De et al. "A Calculation-Efficient Algorithm for Decision Feedback Equalizers." *IEEE International Conference on Consumer Electronics*, 1999, pp. 64-65, XP002388992, Piscataway, US.

Parthapratim De et al., "A Calculation-Efficient Algorithm for Decision Feedback Equalizers." *IEEE Transaction on Consumer Electronics*, Aug. 1999, pp. 526-532, vol. 45, No. 3, XP002388991, New York, US.

Lingyan Fan et al., "Efficient Robust Adaptive Decision Feedback Equalizer for Large Delay Sparse Channel." *IEEE Transaction on Consumer Electronics*, May 2005, pp. 449-456, vol. 51, No. 2, XP002388993, New York, US.

\* cited by examiner

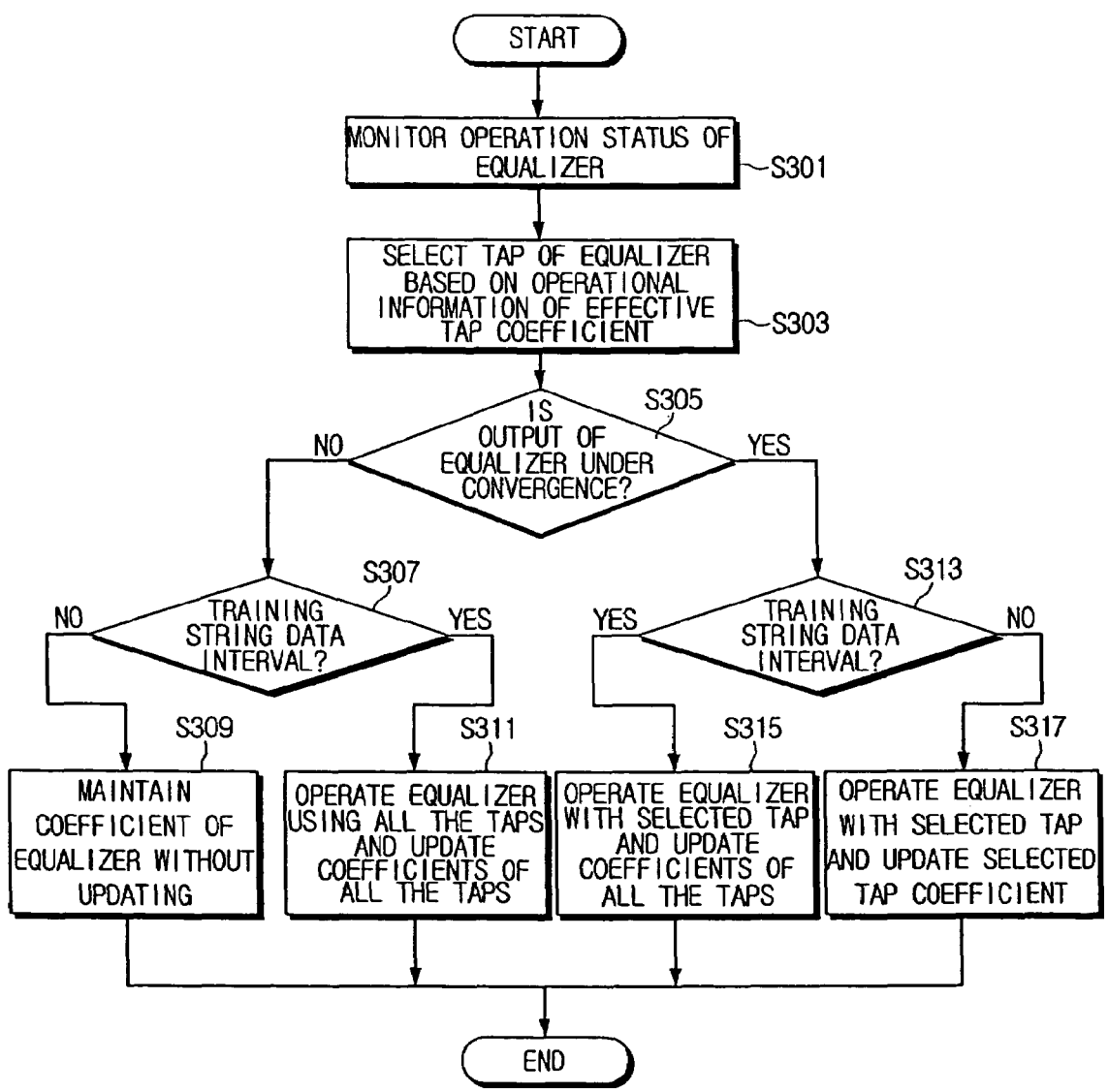

METHOD AND APPARATUS TO CONTROL OPERATION OF AN EQUALIZER

CROSS-REFERENCE TO RELATED APPLICATIONS

This application claims the benefit of Korean Patent Application No. 2004-50257 filed Jun. 30, 2004, in the Korean Intellectual Property Office, the disclosure of which is incorporated herein by reference in its entirety.

BACKGROUND OF THE INVENTION

1. Field of the Invention

The present general inventive concept generally relates to a method and an apparatus to control operation of an equalizer such that a configuration of the equalizer can be easily implemented in hardware by adaptively selecting and updating one or more tap coefficients of the equalizer without separately estimating channel information.

2. Description of the Related Art

In a digital communication channel, unwanted intersymbol interference (ISI) is generated in an amplitude and a phase of a signal that is transmitted along the digital communication channel due to abnormal characteristics in a limited bandwidth. The intersymbol interference becomes a major obstacle to efficient usage of a frequency band and performance improvement. In order to compensate the signal that is distorted by the intersymbol interference, an equalizer becomes necessary. The equalizer may be necessary with a digital broadcast as well as with an analog broadcast.

A VSB (Vestigial sideband) modulation or a COFDM (Coded Orthogonal Frequency Division Mutiplexing) modulation may be used to transmit signals in the digital broadcast.

A data frame transmitted by the digital broadcast of the VSB modulation includes two data fields, each data field including 313 data segments. Out of these 313 data segments, a first data segment is a synchronizing signal and includes a training data string (hereinafter 'training string signal') used by the equalizer in a receiver. Additionally, TDS-OFDM (time domain synchronous-OFDM), which is a type of OFDM (orthogonal frequency division multiplexing), transfers an OFDM frame signal formed by interposing the training string signal.

The training string signal is a signal that is previously set between a receiving side and a transmitting side, and provides information for correcting channel distortion. The channel distortion refers to a phenomenon in which a radio wave that carries the digital communication channel is transformed into a form other than an original form due to various occurrences during transmission of the radio wave. The equalizer can select proper tap coefficients using the training string signal.

Some equalizers have attempted to equalize the digital communication channel by selecting and/or updating a proper tap coefficient according to a channel environment thereof. These equalizers have been able to reduce noise and obtain a rapidly converging error by enlarging the step size, as opposed to an equalization process that is performed using all of the taps of the equalizer. Thus, technology that estimates channels using various methods have recently been developed. By using estimated channel information, a tap to be used during equalization can be selected and updated.

However, when the tap and a corresponding coefficient are selected according to an incorrect estimation of the channel information, the performance of the equalizer may deteriorate. Thus, complicated algorithms are typically utilized to estimate the channel information. Accordingly, hardware used to implement the complicated algorithms has become increasingly complicated.

SUMMARY OF THE INVENTION

Accordingly, the present general inventive concept provides a method and an apparatus to control operation of an equalizer having a simple hardware implementation by monitoring a tap coefficient value of the equalizer that has converged to a certain extent in order to select an appropriate tap coefficient and by controlling the operation of the equalizer according to a convergence state of the equalizer.

Additional aspects of the present general inventive concept will be set forth in part in the description which follows and, in part, will be obvious from the description, or may be learned by practice of the general inventive concept.

The foregoing and/or other aspects of the present general inventive concept may be achieved by providing an apparatus to control operation of an equalizer, the apparatus comprising a monitor unit to periodically monitor the equalizer to output convergence information about whether the equalizer is in a convergence state and positional information about one or more effective taps of the equalizer, a tap coefficient selecting unit to output to the equalizer selected tap information about a plurality of taps selected based on the positional information about the one or more effective taps received from the monitor unit, and an operation mode controlling unit to control the equalizer to perform an equalization operation on a received signal in at least one operation mode using the selected tap information according to positional information about a training string data interval received with the signal and the convergence information received from the monitor unit.

The monitor unit may determine that the equalizer is in the convergence state by measuring a signal to noise ratio (SNR) of an output of the equalizer and determining whether the measured SNR is equal to or greater than a predetermined threshold value.

The monitor unit may determine that a tap having a coefficient value above a preset coefficient value is an effective tap by periodically checking tap coefficients of the equalizer.

The tap coefficient selecting unit may select the plurality of taps by selecting the one or more effective taps, selecting a predetermined number of first taps located adjacent a first side of each of the one or more effective taps, and selecting the predetermined number of second taps adjacent a second side of each of the one or more effective taps from among all of a plurality of taps of the equalizer.

The operation mode controlling unit can control the equalizer by providing a control signal to operate in one of a first mode to maintain tap coefficients of the equalizer without updating the tap coefficients, a second mode to operate the equalizer using all taps and to update the corresponding coefficients of all the taps, a third mode to operate the equalizer with the plurality of selected taps and to update corresponding tap coefficients of the plurality of selected taps, and a fourth mode to operate the equalizer with the plurality of selected taps and to update the tap coefficients of all the taps thereof.

The operation mode controlling unit can control the equalizer by providing the control signal to the equalizer to operate in a selected mode depending on whether an output of the equalizer is in the convergence state and whether the received signal is in the training string data interval.

The operation mode controlling unit can control the equalizer by providing a first control signal to the equalizer to operate in the first mode when an output of the equalizer is not in the convergence state and the received signal is not in the training string data interval, providing a second control signal to the equalizer to operate in the second mode when the output of the equalizer is not in the convergence state and the received signal is in the training string data interval, providing a third control signal to the equalizer to operate in the third mode when the output of the equalizer is in the convergence state and the received signal is not in the training string data interval, and providing a fourth control signal to the equalizer to operate in the fourth mode when the output of the equalizer is in the convergence state and the received signal is in the training string data interval.

The foregoing and/or other aspects of the present general inventive concept may also be achieved by providing an equalizer comprising the an equalizer controlling apparatus, wherein the equalizer updates tap coefficients according to selected tap information received from a tap coefficient selecting unit and an operation mode information received from an operation mode controlling unit to equalize a received signal distorted by a channel environment of a communication channel.

The foregoing and/or other aspects of the present general inventive concept are also achieved by providing a receiver comprising an equalizer controlling apparatus, wherein the equalizer controlling apparatus controls an equalizing operation of an equalizer to update tap coefficients to equalize a received signal distorted by a channel environment in a communication channel.

The foregoing and/or other aspects of the present general inventive concept may also be achieved by providing a method of controlling an operation of an equalizer, the method comprising periodically monitoring the equalizer to determine convergence information about whether the equalizer is in a convergence state and positional information about one or more effective taps of the equalizer, providing selected tap information to the equalizer about a plurality of taps selected based on the positional information of the one or more effective taps, controlling an operation mode of the equalizer based on positional information about a training string data interval received with a received signal to be equalized and the convergence information, and equalizing the received signal according to the selected tap information and the controlled operation mode.

The monitoring of the equalizer may comprise measuring a signal to noise ratio (SNR) of an output of the equalizer and determining that the equalizer is in the convergence state when the measured SNR is equal to or greater than a predetermined threshold value.

The monitoring of the equalizer to determine the positional information about the one or more effective taps may comprise determining that a tap that has a corresponding coefficient value that is above a preset coefficient value is an effective tap by periodically checking tap coefficients of the equalizer.

The providing of the selected tap information may comprise selecting the plurality of taps by selecting the one or more effective taps, selecting a predetermined number of first taps located adjacent a first side of each of the one or more effective taps, and selecting the predetermined number of second taps located adjacent a second side of each of the one or more effective taps from among all of a plurality of taps of the equalizer.

The controlling of the operation mode of the equalizer may comprise selecting an operation mode from among a first mode to maintain tap coefficients of the equalizer without updating the tap coefficients, a second mode to operate the equalizer using all taps and to update corresponding coefficients of all the taps, a third mode to operate the equalizer with the plurality of selected taps and to update corresponding tap coefficients of the plurality of selected taps, and a fourth mode to operate the equalizer with the plurality of selected taps and to update the tap coefficients of all the taps.

The controlling of the operation mode of the equalizer may further comprise controlling the equalizer to operate in the selected operation mode depending on whether an output of the equalizer is in the convergence state and the received signal is in the training string data interval.

The controlling of the operation mode of the equalizer may further comprise controlling the equalizer to operate in the first mode when an output of the equalizer is not in the convergence state and the received signal is not in the training string data interval, controlling the equalizer to operate in the second mode when the output of the equalizer is not in the convergence state and the received signal is in the training string data interval, controlling the equalizer to operate in the third mode when the output of the equalizer is in the convergence state and the received signal is not in the training string data interval, and controlling the equalizer to operate in the fourth mode when the output of the equalizer is in the convergence state and the received signal is in the training string data interval.

BRIEF DESCRIPTION OF THE DRAWINGS

These and/or other aspects of the present general inventive concept will become apparent and more readily appreciated from the following description of the embodiments, taken in conjunction with the accompanying drawings of which:

FIG. 3 illustrates a method of controlling an operation off an equalizer according to an embodiment of the present general inventive concept.

DETAILED DESCRIPTION OF THE PREFERRED EMBODIMENTS

Figure 1:
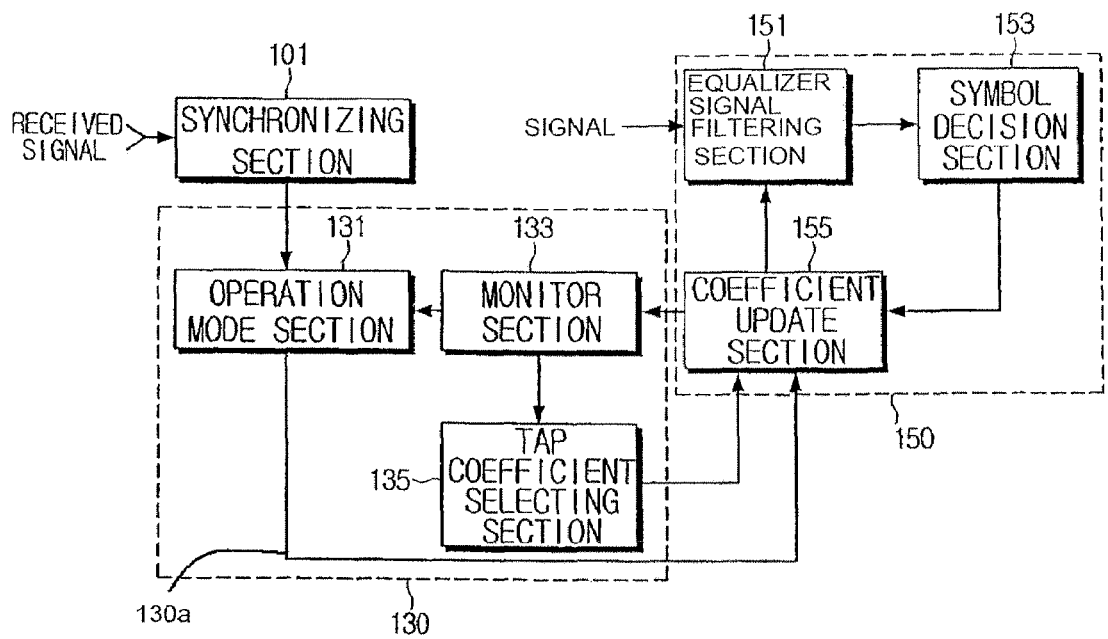
FIG. 1 is a block diagram illustrating an apparatus to control an operation of an equalizer according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating an apparatus 130 to control an operation of an equalizer 150 according to an embodiment of the present general inventive concept. With reference to FIG. 1, the equalizer controlling apparatus 130 communicates with a synchronizing section (unit) 101 and the equalizer 150. The equalizer 150 and the equalizer controlling apparatus 130 may collectively be referred to as an "equalizer."

The synchronizing section 101 performs a synthesizing process, such as a carrier restoration, a frame synthesizing restoration, or the like, on data that is received on a communication channel, and outputs the synthesized restored data.

The equalizer 150 receives and adaptively equalizes the synthesized restored data, thereby eliminating intersymbol interference that results from multipaths. The equalizer 150 performs a tap coefficient update algorithm and an equalizing operation based on control signals supplied from the equalizer controlling apparatus 130. The equalizer 150 can utilize both linear equalization and non-linear equalization. In particular, the equalizer 150 can utilize an LMS (Least Mean Square) equalization and a DF (Decision Feedback) equalization. Additionally, the equalizer 150 may include a device that is capable of controlling a step size for all internal taps thereof. The equalizer 150 and the equalizer controlling apparatus 130 may be included in a broadcast receiving apparatus.

The equalizer 150 comprises an equalizer filtering section (unit) 151, a coefficient update section (unit) 155, and a symbol decision section (unit) 153.

The equalizer filtering section 151 receives a symbol signal that is digitally converted (e.g., interfered with) after passing through the communication channel, and performs an equalizing operation on the symbol signal. The equalizer filtering section 151 may include a feedforward filter and a feedback filter. The equalizer filtering section 151 equalizes signals using a plurality of taps, and may determine tap coefficients for the plurality of taps by performing a tap coefficient algorithm for each tap. The equalizer 150 may include 400 taps. Alternatively, the equalizer 150 may include various other numbers of taps that achieve the intended purposes described herein.

The coefficient update section 155 updates one or more of the tap coefficients according to an error value. The error value is a value obtained by subtracting an output of the equalizer filtering section 151 from an output of the symbol decision section 153. A step size used in the tap coefficient algorithm may be a fixed value or may be varied among a plurality of fixed values.

The symbol decision section 153 determines a symbol value of the symbol signal and provides the determined symbol value to the coefficient update section 155. The symbol decision section 153 may comprise a slicer or Viterbi decoder. Based on the symbol signal input thereto, the symbol decision section 153 determines a symbol as the closet value out of a plurality of symbol values that are transmittable.

The equalizer controlling apparatus 130 according to an embodiment of the present general inventive concept comprises a monitor section (unit) 133, a tap coefficient selecting section (unit) 135, and an operation mode section (unit) 131.

The monitor section 133 measures a signal to noise ratio of an output of the equalizer 150 and transmits convergence information indicating a convergence state of the equalizer 150 to the operation mode section 131. The equalizer 150 converges when a minimum error is reached by repeatedly determining an error value and updating the tap coefficients according to the determined error value and/or an equalizer step size. Additionally, the monitor section 133 periodically checks the tap coefficients of the equalizer 150 and provides the tap coefficient selecting section 135 with positional information about an effective tap having a coefficient value that is above a preset coefficient value.

The monitor section 133 also periodically checks an error value of the equalizer 150 in order to identify the convergence state of the equalizer 150. The monitor section 133 measures the signal to noise ratio of the equalizer 150 using the checked error value and known data to determine whether the measured signal to noise ratio is above a preset threshold value. When the measured signal to noise ratio is above the preset threshold value, the monitor section 133 determines that operation status of the equalizer 150 is in the convergence state. In other words, since the signal to noise ratio is inversely related to the error value, the monitor section 133 can determine whether the error value is converging from the measured signal to noise ratio. In some embodiments, the monitor section 133 may check only the error value of the equalizer 150 and pass the checked error value to the operation mode section 131. The operation mode section 131 may instead determine whether the operation status of the equalizer 150 is in the convergence state according to the checked error value.

Additionally, the monitor section 133 periodically checks values of the tap coefficients of the equalizer 150. The monitor section 133 determines that a tap having a coefficient value that is above the preset coefficient value among the plurality of taps of the equalizer 150 is an effective tap and provides the positional information about the effective tap to the tap coefficient selecting section 135. The effective tap (hereinafter "effective tap(s)") may include a plurality of effective taps having corresponding coefficient values that are greater than the preset value.

Based on the positional information about the effective tap(s) received from the monitor section 133, the tap coefficient selecting section 135 selects a tap to be used to control the operation of the equalizer 150 by adding a preset number of taps to the left and to the right for each of the effective tap(s). The selected tap (hereinafter "selected tap(s)") may include a plurality of selected taps including the effective tap(s) and surrounding taps within the preset number. The preset number of taps added on each side of the effective tap(s) may be in the range of 1 to 5. The tap coefficient selecting section 135 provides information about the selected tap(s) to the coefficient update section 155.

Figure 2:
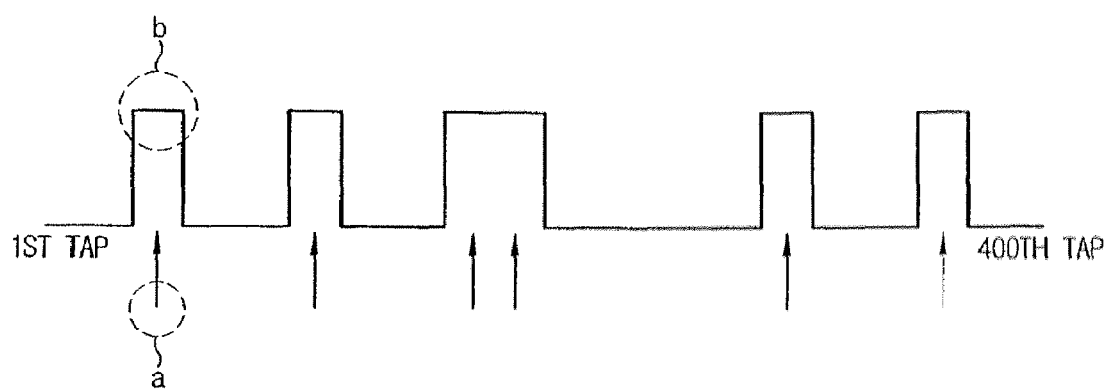
FIG. 2 illustrates an operation of a tap coefficient selecting section of the equalizer controlling apparatus of FIG. 1.

FIG. 2 illustrates an operation of the tap coefficient selecting section 135 of the equalizer controlling apparatus 130 of FIG. 1. With reference to FIGS. 1 and 2, the equalizer 150 may include 400 taps. A group of arrows represents the effective tap(s) determined by the monitor section 133, and represents a case where the coefficient values of six taps from among the 400 taps are above the preset coefficient value. For example, coefficient selecting section 135 selects a tap (a) including a certain margin of surrounding taps to be provided to the coefficient update section 155. A pulse (b) represents the surrounding taps that are within the certain margin that are also selected by adding the preset number of taps to the left and to the right of the effective tap (a). In other words, the monitor section 133 determines which of the plurality of taps of the equalizer 150 are effective tap(s), and the tap coefficient selecting section 135 selects the effective tap(s) along with taps that surround the effective tap(s) and controls the coefficient update section 155, accordingly.

The operation mode section 131 controls an operation mode of the equalizer 150 using positional information of a training string signal received from the synchronizing section 101 and the convergence information of the equalizer 150 received from the monitor section 133. Thus, it is possible to update the tap coefficients of the equalizer 150 through feedback of an operational result of the equalizer 150 without estimating channel information. The operation mode section 131 outputs to the equalizer 150 the control signals 130a to control the equalizer 150 between four operation modes. The coefficient update section 155 of the equalizer 150 receives the control signals from the operation mode section 131 and controls the equalizer filtering section 151 accordingly.

A first operation mode refers to a state in which the equalizer 150 operates while maintaining a current value without updating the tap coefficients thereof. A second operation mode refers to a state in which the equalizer 150 operates with all the taps of the equalizer 150 and the corresponding coefficients of all the taps are updated. A third operation mode refers to a state in which the equalizer 150 operates with only the selected tap(s) and only the selected tap coefficient(s) are updated. A fourth operation mode refers to a state in which the equalizer 150 operates with only the selected tap(s) and the coefficients of all the taps are updated. The tap coefficient selecting section 135 provides information about the selected tap(s) to the equalizer 150.

When the equalizer 150 is not in the convergence state, the operation mode section 131 provides a second control signal to the equalizer 150 to operate in the second operation mode when a signal received from the synchronizing section 101 corresponds to an interval of the training string signal. When the equalizer 150 is not in the convergence state, the operation mode section 131 provides a first control signal to the equalizer 150 to operate in the first operation mode when the signal received from the synchronizing section 101 does not correspond to the interval of the training string signal. In general, when the equalizer 150 is not in the convergence state refers to a time immediately after a broadcast receiving apparatus (not shown) that includes the equalizer 150 is powered on, or a time in which the communication channel is abruptly changed. Alternatively, the operation mode section 131 can control the equalizer 150 to operate in the second operation mode regardless of whether the signal received from the synchronizing section 101 is in the training string signal interval. In this case, the operation mode section 131 controls the equalizer 150 to operate in the second operation mode whenever the equalizer 150 is not in the convergence state.

When the equalizer 150 is in the convergence state, the operation mode section 131 controls the equalizer 150 to operate with only the selected tap(s). In this case, the operation mode section 131 provides a fourth control signal to the equalizer 150 to operate in the fourth operation mode when the signal received from the synchronizing section 101 corresponds to the interval of the training string signal. Additionally, the operation mode section 131 provides a third control signal to the equalizer 150 to operate in the third operation mode when the signal received from the synchronizing section 101 does not correspond to the interval of the training string signal. Alternatively, the operation mode section 131 can control the equalizer 150 to operate in the third operation mode or the fourth operation mode regardless of the training string signal interval. In this case, the operation mode section 131 controls the equalizer 150 to operate in one of the third or fourth operation modes whenever the equalizer 150 is in the convergence state.

FIG. 3 illustrates a method of controlling an operation of an equalizer according to the present general inventive concept. In some embodiments, the method of controlling the operation of the equalizer may be performed by the equalizer controlling apparatus 130 of FIG. 1 and may be applied to the equalizer 150. Thus, the method of FIG. 3 will be described with reference to FIG. 1.

The monitor section 133 monitors the operation of the equalizer 150. The monitor section 133 measures the signal to noise ratio of the output of the equalizer 150 to provide the convergence information that indicates the convergence state of the equalizer 150 to the operation mode section 131, and periodically checks the tap coefficients of the equalizer 150 to provide the positional information about the effective tap(s) to the tap coefficient selecting section 135 (operation S301).

The tap coefficient selecting section 135 determines the selected tap(s) based on the positional information about the effective tap(s) received from the monitor section 133. The tap coefficient selecting section 135 then transfers the information about the selected tap(s) to the coefficient update section 155 of the equalizer 150 (operation S303).

The operation mode section 131 receives the convergence information of the equalizer 150 from the monitor section 133 to determine whether the equalizer 150 is in the convergence state (operation S305), and receives the positional information about the training string data interval from the synchronizing section 101 to determine whether an input signal of the equalizer 150 is in the training string data interval or is not in the training string data interval (operation S307 and S313).

When the equalizer 150 is determined not to be in the convergence state, the operation mode section 131 provides the first control signal to the equalizer 150 to operate in the first operation mode (operation S309) when the signal input to the equalizer 150 does not correspond to the training string data interval, and the operation mode section 131 provides the second control signal to the equalizer 150 to operate in the second operation mode (operation S311) when the input signal corresponds to the training string data interval. When the equalizer 150 is determined to be in the convergence state, the operation mode section 131 provides the third control signal to the equalizer 150 to operate in the third operation mode (operation S317) when the signal input does not correspond to the training string data interval, and the operation mode section 131 provides the fourth control signal to the equalizer 150 to operate in the fourth operation mode (operation S315) when the signal input corresponds to the training string data interval.

The coefficient update section 155 of the equalizer 150 operates the equalizer 150 based on selected tap information received from the tap coefficient selecting section 135 and operational mode information of the operation mode section 131.

Accordingly, various embodiments of the equalizer controlling apparatus 130 according to the present general inventive concept can control the equalizer 150.

As described above, in accordance with various embodiments of the present general inventive concept, in order to control proper operation of an equalizer, it is not necessary to estimate channel information. As a result, the configuration of the equalizer is relatively simple, since a tap coefficient is not selected according to the estimation of the channel information. Additionally, it is possible to select and update an appropriate tap depending on a change in a channel environment as indicated by a measured error value. Further, it is possible improve performance of the equalizer by monitoring an output thereof and feeding the output of the equalizer back to an equalizer control apparatus.

The embodiments of the present general inventive concept can be embodied in software, hardware, or a combination thereof. In particular, some embodiments can be computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, DVDs, etc.), and storage media such as carrier waves (e.g., transmission through the internet). The computer readable recording medium can also be distributed over network coupled computer systems so that the computer programs are stored and executed in a distributed fashion.

The foregoing embodiment and advantages are merely exemplary and are not to be construed as limiting the present general inventive concept. The present teachings can be readily applied to other types of apparatuses. Also, the description of the embodiments of the present general inventive concept is intended to be illustrative, and not to limit the scope of the claims, and many alternatives, modifications, and variations will be apparent to those skilled in the art. Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An apparatus to control an equalizer, the apparatus comprising:
 a monitor unit to periodically monitor the equalizer according to taps, and to output convergence information about whether the equalizer is in a convergence state and positional information about one or more effective taps of the taps of the equalizer;
 a tap coefficient selecting unit to output to the equalizer selected tap information about a plurality of selected taps of the taps selected based on the positional information about the one or more effective taps received from the monitor unit; and
 an operation mode controlling unit to control the equalizer to perform an equalization operation on a received signal in at least one operation mode using the selected tap information according to second positional information about a training string data interval of the received signal and the convergence information received from the monitor unit.

2. The apparatus as recited in claim 1, wherein the monitor unit determines that the equalizer is in the convergence state by measuring a signal to noise ratio (SNR) of an output of the equalizer and determining whether the measured SNR is equal to or greater than a predetermined threshold value.

3. The apparatus as recited in claim 1, wherein the monitor unit determines that a tap having a coefficient value that is above a preset coefficient value is the one or more effective taps by periodically checking tap coefficients of the equalizer.

4. The apparatus as recited in claim 1, wherein the tap coefficient selecting unit selects the plurality of selected taps by selecting a predetermined number of first taps located adjacent a first side of each of the one or more effective taps and selecting the predetermined number of second taps adjacent a second side of each of the one or more effective taps from among all of the taps of the equalizer.

5. The apparatus recited in claim 1, wherein the operation mode controlling unit controls the equalizer by providing a control signal to the equalizer to operate in the at least one operation mode comprising:
 a first mode to maintain tap coefficients of the equalizer without updating the tap coefficients,
 a second mode to operate the equalizer using all taps and to update corresponding coefficients of all the taps,
 a third mode to operate the equalizer with the plurality of selected taps and to update corresponding tap coefficients of the plurality of selected taps, and
 a fourth mode to operate the equalizer with the plurality of selected taps and to update the tap coefficients of all the taps thereof.

6. The apparatus as recited in claim 5, wherein the operation mode controlling unit controls the equalizer by providing the control signal to the equalizer to operate in the one of the at least one operation mode depending on whether an output of the equalizer is in the convergence state and whether the received signal is in the training string data interval.

7. The apparatus as recited in claim 5, wherein the operation mode controlling unit controls the equalizer by:
 providing a first control signal to the equalizer to operate in the first mode when the output of the equalizer is not in the convergence state and the received signal is not in the training string data interval,
 providing a second control signal to the equalizer to operate in the second mode when the output of the equalizer is not in the convergence state and the received signal is in the training string data interval,
 providing a third control signal to the equalizer to operate in the third mode when the output of the equalizer is in the convergence state and the received signal is not in the training string data interval, and
 providing a fourth control signal to the equalizer to operate in the fourth mode when the output of the equalizer is in the convergence state and the received signal is in the training string data interval.

8. An equalizer controller usable with an equalizer having a plurality of taps, the equalizer controller comprising:
 a monitor unit to detect an error value of the equalizer and to determine whether the error value is converging and to determine one or more effective taps from among the plurality of taps of the equalizer;
 a tap selection unit to select one or more selected taps according to the determined one or more effective taps; and
 an operation mode unit to control the equalizer to operate in a mode with all of the plurality of taps when the monitor unit determines that the error value is not converging and to operate in another mode with the one or more selected taps selected from all of the plurality of taps when the monitor unit determines that the error value is converging.

9. The equalizer controller as recited in claim 8, wherein the monitor unit determines whether the error value is converging by measuring a signal to noise ratio (SNR) of the equalizer and determining whether the measured SNR is greater than a predetermined value.

10. The equalizer controller as recited in claim 8, wherein the monitor unit determines the one or more effective taps by determining one or more tap coefficients corresponding to the one or more effective taps that have values that are greater than a coefficient value threshold.

11. The equalizer controller as recited in claim 10, wherein the tap selection unit selects the one or more effective taps and a predetermined number of surrounding taps for each of the one or more effective taps as the one or more selected taps.

12. The equalizer controller as recited in claim 11, wherein the plurality of taps includes 400 taps and the predetermined number of surrounding taps includes between 1 and 5 taps on each side of each of the one or more effective taps.

13. The equalizer controller as recited in claim 8,
 wherein the monitor unit periodically checks coefficient values of the plurality of taps to determine which ones of the plurality of taps are effective and provides information about the effective taps to the tap selection unit such that the tap selection unit selects at least the effective taps as the selected one or more taps.

14. An equalizer controller usable with an equalizer having a plurality of taps, the equalizer controller comprising:
 a monitor unit to detect an error value of the equalizer and to determine whether the error value is converging; and
 an operation mode unit to control the equalizer to operate in a mode with all of the plurality of taps when the monitor unit determines that the error value is not converging and to operate in another mode with one or more selected taps selected from all of the plurality of taps when the monitor unit determines that the error value is converging; and
 a receiving unit to receive a signal to be equalized by the equalizer, the received signal including a training data interval and to provide position information about the training data interval to the operation mode unit.

15. The equalizer controller as recited in claim 14, wherein the another mode comprises a third mode in which coefficient values of all of the plurality of taps are updated and a fourth mode in which coefficient values of the selected one or more taps are updated, and the operation mode unit controls the equalizer to operate in the third mode with the one or more selected taps while updating the coefficient values of all of the plurality of taps when the monitor unit determines that the error value is converging and the received signal is in the training data interval and to operate in the fourth mode with all of the plurality of taps while updating the coefficient values of the one or more selected taps when the monitor unit determines that the error value is converging and the received signal is not in the training data interval.

16. The equalizer controller as recited in claim 14, wherein the mode comprises a first mode in which coefficient values of all of the plurality of taps are maintained at a present value and a second mode in which coefficient values of all of the plurality of taps are updated, and the operation mode unit controls the equalizer to operate in the first mode with all of the plurality of taps while maintaining the coefficient values of all the plurality of taps at the present value when the monitor unit determines that the error value is not converging and the received signal is not in the training data interval and to operate in the second mode with all of the plurality of taps while updating the coefficient values of all of the plurality of taps when the monitor unit determines that the error value is not converging and the received signal is in the training data interval.

17. An equalizer controlling apparatus, comprising:
a monitor unit to monitor a state of an error value of an equalizer having a plurality of taps and to monitor a state of a signal input to the equalizer; and
a control unit to control the equalizer to operate between at least two operation modes according to the state of the error value and the state of the input signal,
wherein the equalizer does not estimate channel information for a communication channel that is equalized.

18. The equalizer controller as recited in claim 17, wherein the at least two operation modes include at least a mode having a first corresponding number of operation taps and a first corresponding number of update taps and another mode having a second corresponding number of operation taps and a second corresponding number of update taps.

19. An apparatus to control an equalizer, the apparatus comprising:
comprising:
a monitor unit to periodically monitor the equalizer according to taps, to output convergence information about whether the equalizer is in a convergence state and positional information about one or more effective taps of the equalizer,
a tap coefficient selecting unit to output to the equalizer selected tap information about a plurality of selected taps selected based on the positional information about the one or more effective taps received from the monitor unit, and
an operation mode controlling unit to control the equalizer to perform an equalization operation on a received signal in at least one operation mode using the selected tap information according to positional information about a training string data interval received with the signal and the convergence information received from the monitor unit,
wherein the equalizer updates tap coefficients according to the selected tap information received from the tap coefficient selecting unit and operation mode information received from the operation mode controlling unit to equalize the received signal distorted by a channel environment of a communication channel.

20. A receiver, comprising:
an equalizer control apparatus, comprising:
a monitor unit to periodically monitor an equalizer, to output convergence information about whether the equalizer is in a convergence state and positional information about one or more effective taps of the equalizer,
a tap coefficient selecting unit to output to the equalizer selected tap information about a plurality of selected taps selected based on the positional information about the one or more effective taps received from the monitor unit, and
an operation mode controlling unit to control the equalizer to perform an equalization operation on a received signal in at least one operation mode using the selected tap information according to positional information about a training string data interval received with the signal and the convergence information received from the monitor unit,
wherein the receiver controls the equalizing operation of the equalizer and updating of tap coefficients to equalize the received signal distorted by a channel environment of a communication channel.

21. A broadcast receiving apparatus, comprising:
an equalizer having a plurality of taps to equalize a signal received on a communication channel; and
an equalizer controller to control operation of the equalizer according to a first one or more of the plurality of taps and to control an update of a second one or more of the plurality of taps according to a first determination of whether an error value of the equalizer is converging and a second determination of whether the received signal is in a training interval.

22. The apparatus as recited in claim 21, wherein the equalizer controller comprises:
a monitor unit to detect the error value of the equalizer and to determine whether the error value is converging; and
an operation mode unit to control the equalizer to operate in a first mode with one or more selected taps when the monitor unit determines that the error value is converging and to operate in a second mode with all of the plurality of taps when the monitor unit determines that the error value is not converging.

23. The apparatus as recited in claim 21, wherein the equalizer comprises one of a linear equalizer, a non-linear equalizer, a least mean squares equalizer, and a decision feedback equalizer.

24. The apparatus as recited in claim 21, wherein the equalizer comprises:
an equalizer filtering unit to equalize the received signal according to the first one or more of the plurality of taps;
a symbol decision unit to receive the equalized received signal and to decide one or more symbols of the received signal; and
a coefficient update unit to receive a control signal from the equalizer controller to determine the second one or more of the plurality of taps and to update the second one or more of the plurality of taps according to the error value between the one or more symbol signals determined by the symbol decision unit and the equalized signal.

25. A method of controlling operation of an equalizer, the method comprising:
periodically monitoring the equalizer according to taps to determine convergence information about whether the equalizer is in a convergence state and positional information about one or more effective taps of the equalizer;
providing selected tap information to the equalizer about a plurality of selected taps selected based on the positional information about the one or more effective taps;

controlling an operation mode of the equalizer based on positional information about a training string data interval received with a signal to be equalized and the convergence information; and equalizing the received signal according to the selected tap information and the controlled operation mode.

26. The method as recited in claim 25, wherein the monitoring of the equalizer comprises measuring a signal to noise ratio (SNR) of an output of the equalizer and determining that the equalizer is in the convergence state when the measured (SNR) is equal to or greater than a predetermined threshold value.

27. The method as recited in claim 25, wherein the monitoring of the equalizer to determine the positional information about the one or more effective taps comprises determining that a tap that has a corresponding coefficient value that is above a preset coefficient value is an effective tap by periodically checking tap coefficients of the equalizer.

28. The method as recited in claim 25, wherein the providing of the selected tap information comprises selecting the plurality of taps obtained by selecting the one or more effective taps, selecting a predetermined number of first taps located adjacent a first side of each of the one or more effective taps, and selecting the predetermined number of second taps located adjacent a second side of each of the one or more effective taps from among all of a plurality of taps of the equalizer.

29. The method recited in claim 25, wherein the controlling of the operation mode of the equalizer comprises selecting an operation mode from among:
  a first mode to maintain tap coefficients of the equalizer without updating the tap coefficients,
  a second mode to operate the equalizer using all taps and updating corresponding coefficients of all the taps thereof,
  a third mode to operate the equalizer with the plurality of selected taps and to update corresponding tap coefficients of the plurality of selected taps, and
  a fourth mode to operate the equalizer with the plurality of selected taps and to update the tap coefficients of all taps of the equalizer.

30. The method as recited in claim 29, wherein the controlling of the operation mode of the equalizer further comprises controlling the equalizer to operate in the selected operation mode depending on whether an output of the equalizer is in the convergence state and the received signal is in the training string data interval.

31. The method as recited in claim 29, wherein the controlling the operation mode of the equalizer further comprises:
  controlling the equalizer to operate in the first mode when an output of the equalizer is not in the convergence state and the received signal is not in the training string data interval,
  controlling the equalizer to operate in the second mode when the output of the equalizer is not in the convergence state and the received signal is in the training string data interval,
  controlling the equalizer to operate in the third mode when the output of the equalizer is in the convergence state and the received signal is not in the training string data interval, and
  controlling the equalizer to operate in the fourth mode when the output of the equalizer is in the convergence state and the received signal is in the training string data interval.

32. A method of an equalizer controller usable with an equalizer having a plurality of taps, the method comprising:

detecting an error value of the equalizer and determining whether the error value is converging using a monitor unit;

determining one or more effective taps from among the plurality of taps of the equalizer;

selecting one or more selected taps according to the determined the one or more effective taps and providing the selection to the equalizer; and controlling the equalizer to operate in a mode with all of the plurality of taps when the monitor unit determines that the error value is not converging and to operate in another mode with the one or more selected taps when the monitor unit determines that the error value is converging.

33. The method as recited in claim 32, wherein the determining of whether the error value is converging comprises measuring a signal to noise ratio (SNR) of the equalizer and determining whether the measured SNR is greater than a predetermined value.

34. The method as recited in claim 32, wherein the determining of the one or more effective taps comprises determining one or more tap coefficients of the plurality of taps that have values that are greater than a coefficient value threshold.

35. The method as recited in claim 34, wherein the selecting of the one or more selected taps comprises selecting the one or more effective taps and a predetermined number of surrounding taps for each of the one or more effective taps.

36. The method as recited in claim 35, wherein the plurality of taps includes 400 taps and the predetermined number of surrounding taps includes between 1 and 5 taps on each side of each of the one or more effective taps.

37. The method as recited in claim 33, further comprising:
  receiving a signal to be equalized by the equalizer and the received signal includes a training data interval and determining whether the received signal is in the training data interval.

38. The method as recited in claim 37, wherein the another mode comprises a third mode in which coefficient values of all of the plurality of taps are updated and a fourth mode in which coefficient values of the selected one or more taps are updated, and the controlling the equalizer to operate in the mode comprises controlling the equalizer to operate in the third mode with the one or more selected taps while updating the coefficient values of all of the plurality of taps when the error value is converging and the received signal is in the training data interval and to operate in the fourth mode with all of the plurality of taps while updating the coefficient values of the one or more selected taps when the error value is converging and the received signal is not in the training data interval.

39. The method as recited in claim 38, wherein the mode comprises a first mode in which coefficient values of all of the plurality of taps are maintained at a present value and a second mode in which coefficient values of all of the plurality of taps are updated, and the controlling the equalizer to operate in the another mode comprises controlling the equalizer to operate in the first mode with all of the plurality of taps while maintaining the coefficient values of all of the plurality of taps at the present value when the error value is not converging and the received signal is not in the training data interval and to operate in the second mode with all of the plurality of taps while updating the coefficient values of all of the plurality of taps when the error value is not converging and the received signal is in the training data interval.

* * * * *